United States Patent
Wojniak et al.

(10) Patent No.: US 10,967,547 B2
(45) Date of Patent: Apr. 6, 2021

(54) MOLD, SYSTEM AND METHOD FOR MANUFACTURING A MOLDED PART

(71) Applicant: Honda Motor Co., Ltd., Tokyo (JP)

(72) Inventors: Chad Wojniak, Westerville, OH (US); Kaoru Tokita, Dublin, OH (US); Takeshi Kuriyama, Dublin, OH (US); Kazuhisa Fujiwara, Utsunomiya (JP); Atsushi Ban, Utsunomiya (JP); Naoki Yoshimura, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 739 days.

(21) Appl. No.: 14/860,201

(22) Filed: Sep. 21, 2015

(65) Prior Publication Data

US 2017/0080616 A1    Mar. 23, 2017

(51) Int. Cl.
*B29C 45/00* (2006.01)
*B29C 45/16* (2006.01)
*B29C 45/26* (2006.01)
*B29L 31/30* (2006.01)

(52) U.S. Cl.
CPC .......... *B29C 45/0055* (2013.01); *B29C 45/16* (2013.01); *B29C 45/2669* (2013.01); *B29C 45/0081* (2013.01); *B29C 2793/0009* (2013.01); *B29L 2031/3005* (2013.01); *B29L 2031/3008* (2013.01)

(58) Field of Classification Search
None
See application file for complete search history.

(56) References Cited

U.S. PATENT DOCUMENTS

| 209,104 | A | | 10/1878 | Austin | |
|---|---|---|---|---|---|
| 366,175 | A | | 7/1887 | MacDonald | |
| 3,854,859 | A | | 12/1974 | Sola | |
| 4,342,549 | A | * | 8/1982 | Lemelson | B07C 5/34 249/102 |
| 4,389,535 | A | * | 6/1983 | Slater | H02G 3/123 174/660 |
| 4,958,676 | A | | 9/1990 | Kuntz | |
| 5,063,015 | A | * | 11/1991 | Lloyd | B24C 1/003 264/161 |
| 5,679,303 | A | | 10/1997 | Hayashi et al. | |
| 6,033,613 | A | | 3/2000 | Heyn et al. | |
| 6,073,990 | A | * | 6/2000 | Sauve | B29C 63/0082 29/91 |
| 6,076,246 | A | * | 6/2000 | McCooey | B29C 44/383 264/261 |
| 6,116,886 | A | * | 9/2000 | Tasaka | B29C 45/2673 249/102 |
| 6,554,604 | B1 | | 4/2003 | Schmidt | |
| 6,558,590 | B1 | | 5/2003 | Stewart | |
| 6,638,049 | B1 | | 10/2003 | Moss et al. | |
| 7,918,660 | B2 | | 4/2011 | Babin et al. | |

(Continued)

*Primary Examiner* — Matthew J Daniels
*Assistant Examiner* — Mohammad M Ameen
(74) *Attorney, Agent, or Firm* — Mark E. Duell; Rankin Hill & Clark LLP

(57) ABSTRACT

A mold, system and method for manufacturing a part includes injection molding a substrate in a single injection mold and optionally trimming the panel substrate. The substrate can have a first configuration or a second, different configuration. Trimming of the substrate can occur when the substrate has the first configuration to define an aperture in the substrate.

7 Claims, 12 Drawing Sheets

(56) References Cited

U.S. PATENT DOCUMENTS

| | | | |
|---|---|---|---|
| 8,091,202 B2 | 1/2012 | Galati et al. | |
| 8,275,146 B2 | 9/2012 | Beckley | |
| 8,282,388 B2 | 10/2012 | Galati et al. | |
| 8,343,607 B2 | 1/2013 | Pokorzynski et al. | |
| 8,685,798 B2 | 4/2014 | Shao et al. | |
| 2004/0099988 A1* | 5/2004 | Cowelchuk | B29C 33/306 |
| | | | 264/255 |
| 2005/0140167 A1* | 6/2005 | Jaggi | B60R 13/0243 |
| | | | 296/146.7 |
| 2005/0194806 A1* | 9/2005 | Cowelchuk | B60N 2/78 |
| | | | 296/1.09 |
| 2006/0170252 A1* | 8/2006 | Eichler | B60R 13/0225 |
| | | | 296/214 |
| 2008/0054049 A1 | 3/2008 | Cowelchuk et al. | |
| 2008/0197670 A1* | 8/2008 | VonHoltz | B29C 45/14196 |
| | | | 296/181.2 |
| 2009/0174213 A1 | 7/2009 | Robertson | |
| 2010/0225142 A1 | 9/2010 | Mazur et al. | |
| 2010/0279051 A1* | 11/2010 | Pokorzynski | B29C 43/18 |
| | | | 428/43 |
| 2010/0294064 A1* | 11/2010 | Seko | B29D 15/00 |
| | | | 74/434 |
| 2013/0256951 A1 | 10/2013 | Buehlmeyer et al. | |
| 2013/0260098 A1 | 10/2013 | Penner et al. | |
| 2017/0210306 A1* | 7/2017 | Tavakoli Targhi | |
| | | | B60R 13/0268 |

* cited by examiner

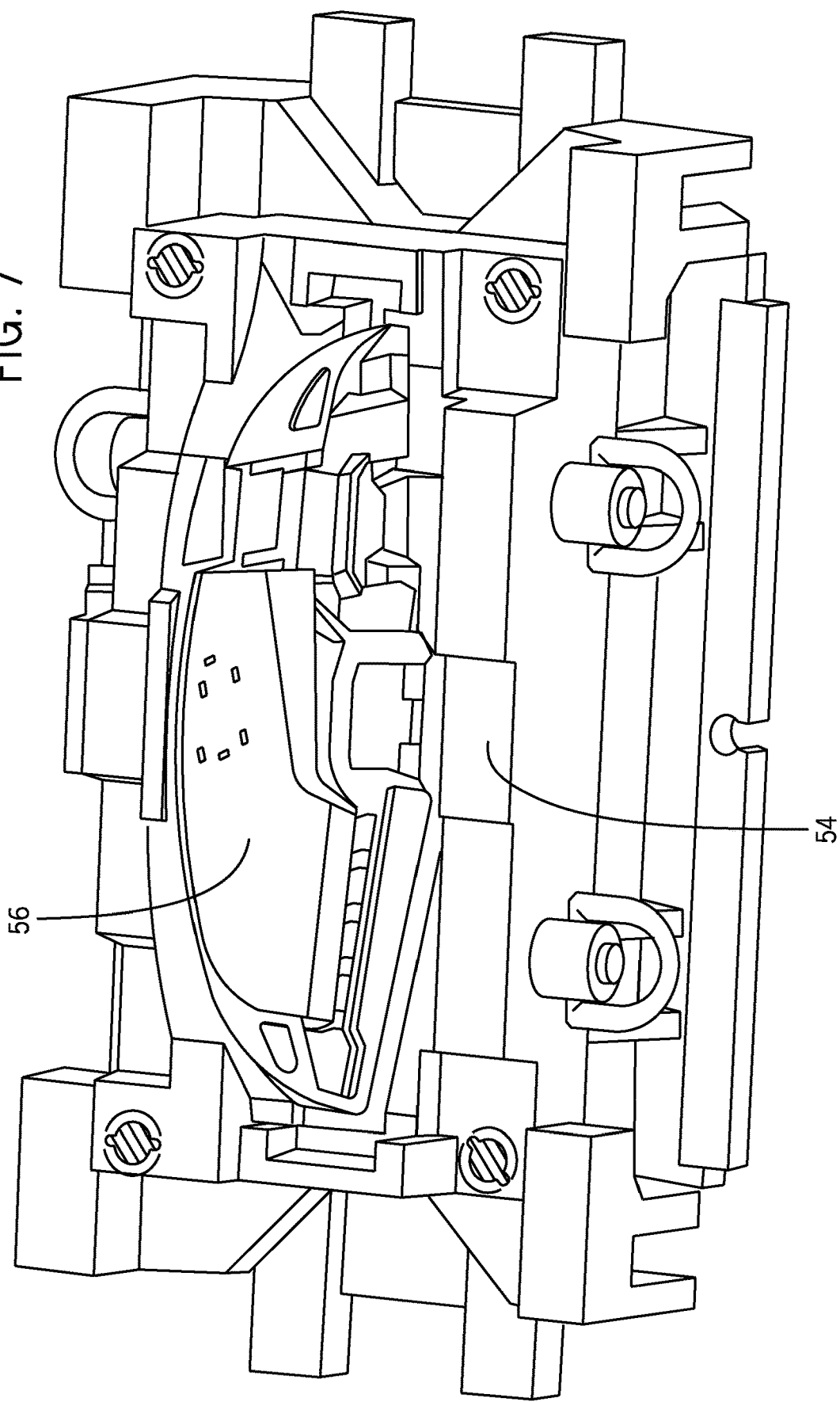

MOLD, SYSTEM AND METHOD FOR MANUFACTURING A MOLDED PART

BACKGROUND

Injection molded panel substrates are used conventionally in a variety of applications. One such application is as part of the instrument panel assembly on a vehicle that is arranged with a generally horizontal portion disposed over the instrument panel components of the vehicle (e.g., speedometer, etc.) that extends toward the front windshield. Sometimes, different vehicles and/or vehicle types have such instrument panel assemblies and injection molded panel substrates therefor configured differently. For example, a base model of a particular vehicle may include a panel substrate configured according to a first configuration and a higher end model of the same vehicle may include a similar panel substrate but configured according to a second configuration. For example, when the panel substrate is to be a part of an instrument panel assembly, the base model may include a generally solid upper portion, whereas the higher end model may include an aperture formed therethrough into which an audio speaker of a vehicle sound system can be accommodated.

Conventionally, separate process lines were needed to form injection molded panel substrates having varying designs or configurations. For example, a first process line could include a first injection mold for injection molding the panel substrate according to a first configuration for use on the base model and a second process line could include a second injection mold for injection molding the panel substrate according to the second configuration for use in the higher end model.

SUMMARY

According to one aspect, a method for manufacturing a panel assembly for a vehicle includes injection molding a panel substrate in a single injection mold and trimming the panel substrate. In particular, the panel substrate can have a first configuration when the panel substrate is for a first vehicle type and the panel substrate can have a second, different configuration when the panel substrate is for a second vehicle type. Trimming of the panel substrate can occur when the panel substrate has the first configuration to define a part aperture in the panel substrate.

According to another aspect, a system for manufacturing a panel assembly for a vehicle is provided. More particularly, the system according to this aspect includes an injection mold for injection molding a panel substrate with a first configuration when the panel substrate is for a first vehicle type and a second, different configuration when the panel substrate is for a second vehicle type. The system further includes a trimmer for trimming a part aperture into the panel substrate when the panel substrate has the first configuration for the first vehicle type.

According to still another aspect, a mold capable of molding different parts includes a first mold surface and a second mold surface positioned opposite the first mold surface. A plurality of recesses on the first mold surface define a perimeter. The mold further includes a plurality of fingers each having an outer surface The fingers are movable from a first position wherein the outer surface of each finger is conformal with the second mold surface to allow a first part to be molded and a second position wherein the fingers are extended outward from the second mold surface and each finger is positioned in one of the recesses along the perimeter to allow a second part to be molded that is different than the first part.

According to a further aspect, a mold capable of molding different parts includes a first mold surface and a second mold surface positioned opposite the first mold surface. The mold further includes a plurality of ridges, a plurality of recesses and a plurality of fingers. The plurality of ridges extend from the first mold surface toward the second mold surface and define a perimeter. The ridges are spaced apart to define gaps therebetween along the perimeter. The plurality of recesses is on the first mold surface with each recess positioned along the mold surface in the gap disposed between adjacent ones of the ridges. The plurality of fingers each have an outer surface and the fingers are movable from a first position wherein the outer surface of each finger is conformal with the second mold surface to allow a first part to be molded and a second position wherein the fingers are extended outward from the second mold surface and positioned in the recesses along the perimeter to allow a second part to be molded that is different than the first part.

BRIEF DESCRIPTION OF THE DRAWINGS

FIG. 7 is an underside perspective view of an upper mold half of the injection mold of FIG. 6.

DETAILED DESCRIPTION

Figure 1:
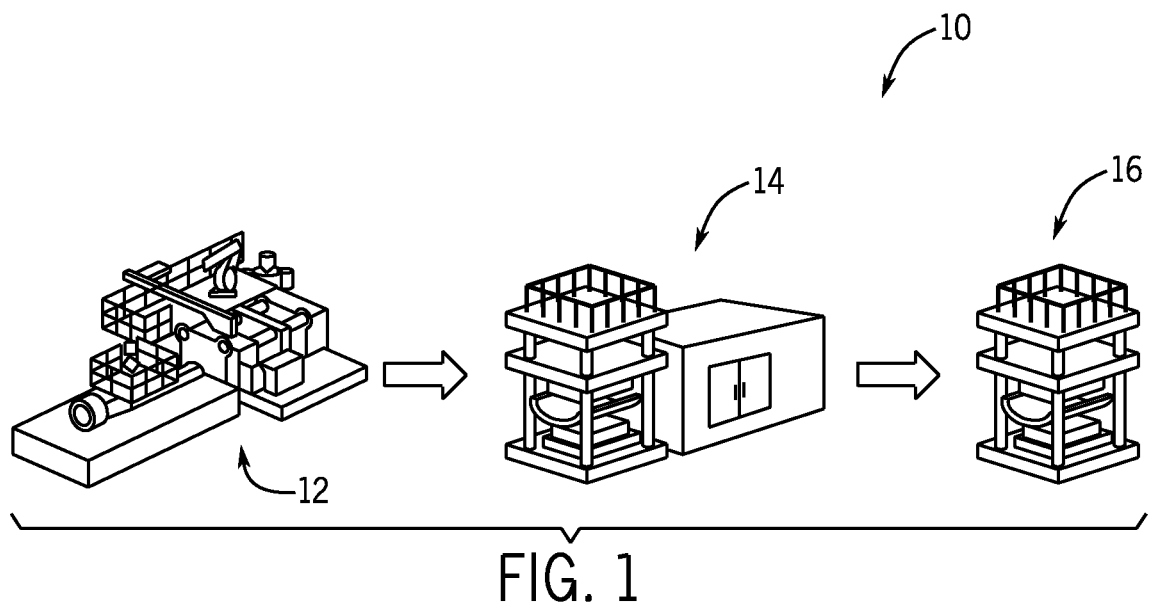
FIG. 1 is a schematic representation of a system for manufacturing a panel assembly for a vehicle according to an exemplary embodiment.

Referring now to the drawings wherein the showings are for purposes of illustrating one or more exemplary embodiments and not for purposes of limiting the same, FIG. 1 illustrates a system for manufacturing a panel assembly of a vehicle and is generally designated by reference numeral 10. As shown, the system 10 of the illustrated embodiment includes an injection mold 12, a secondary process station 14 and a trimming station 16 (all shown schematically). As will be described in more detail below, the injection mold 12 is a single injection mold capable of injection molding a first part and a second part that is different from the first part (i.e., capable of molding different parts). The first and second parts can be panel substrates having varying configurations (e.g., panel substrate 18 in FIG. 4 or panel substrate 20 in FIG. 5). More particularly, from this single injection mold 12, the injection molded panel substrate can have a first configuration (e.g., panel substrate 18 of FIG. 4) when the panel substrate is for a first vehicle type and the panel substrate can have a second, different configuration (e.g., panel substrate 20 of FIG. 5) when the panel substrate is for a second vehicle type. As used herein, vehicle types can represent different vehicles, different vehicle models and/or different model types of the same vehicle model. For example, the first vehicle type could be a base level or type of a vehicle model and the second, different configuration could be a higher end model type of the same vehicle model. Thus, the injection mold 12 is for injection molding the panel substrate with a first configuration (FIG. 4) when the panel substrate is for a first vehicle type and a second, different configuration when the panel substrate (FIG. 5) is for a second vehicle type.

The secondary process station 14 can be a skin installer suitable for optionally forming and then adhering a separate article or skin, such as pad sheet (e.g., pad sheet 22 in FIGS. 2A, 3A and 12), to the panel substrate 18 or 20. In one embodiment, as is understood and appreciated by those skilled in the art, the secondary process station 14 is capable of both forming the pad sheet 22 and adhering the pad sheet 22 to the panel substrate 18 or 20 molded by the injection mold 12. Alternatively, the secondary process station 14 can be provided with an inventory of pad sheets formed elsewhere and function only to adhere each pad sheet 22 to the panel substrate 18 or 20. As known and understood by those skilled in the art, in one embodiment, the pad sheet 22 can be adhered to the panel substrate 18 or 20 via a suitable structural foam. As a further alternative, the secondary process station 14 can affix the separate article (e.g., pad sheet 22) to the substrate 18 or 20 via some other affixing method, such as mechanically coupling via suitable mechanical couplers, conjoining via molding, etc.

The trimming station 16 can include a trimmer 24 (e.g., a trim die cutting edge schematically shown in FIG. 8) provided for trimming a part aperture (e.g., part aperture 26 shown in FIG. 10) into panel substrate 18 when the panel substrate 18 molded by the injection mold 12 has the first configuration for the first vehicle type. In a non-limiting example, the trimmer 24 may be a hydraulic die including one or more blades used to trim the part aperture 26. In one embodiment, the injection mold 12 molds the panel substrate 18, the secondary process station 14 applies the pad sheet 22 to the panel substrate 18 and the trimming station 16 trims or cuts away a portion of the panel substrate to define the part aperture 26 therein. When the panel substrate 20 is molded by the injection mold 12, the panel substrate 20 can bypass the trimming station 16 to avoid being trimmed. Optionally, the secondary process station 14 and the trimming station 16 can be combined and provided as a single station on an assembly line. Those skilled in the art will appreciate that the sequence of installing the skin 22 and the trimming of the part aperture 26 can be reversed if so desired so that the part aperture 26 is first cut and then the pad sheet 22 is applied to the panel substrate 18.

Figure 2:
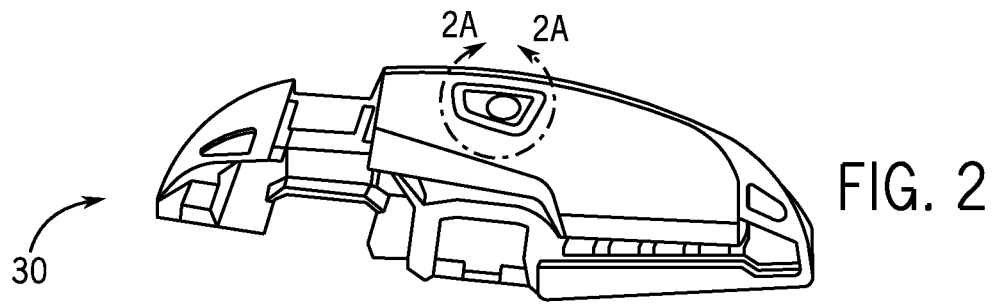
FIG. 2 is a perspective view of a panel assembly having an injection molded panel substrate configured for a first vehicle type.
Figure 2A:
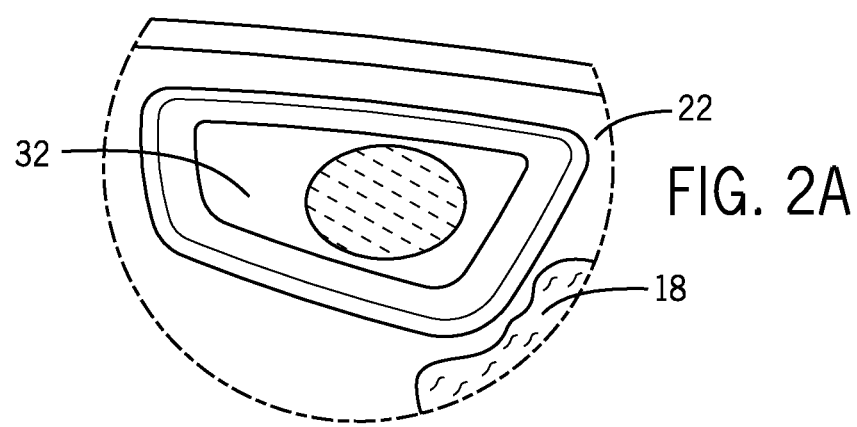
FIG. 2A is an enlarged partial perspective view of the panel assembly of FIG. 2 showing a trim part (e.g., a speaker cover) mounted to a panel substrate over a part aperture defined in the panel substrate.
Figure 3:
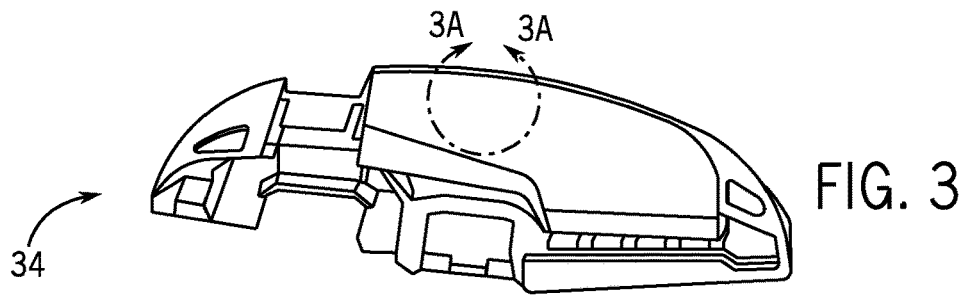
FIG. 3 is a perspective view of a panel assembly having an injection molded panel substrate configured for a second vehicle type.

FIGS. 2, 2A, 3 and 3A illustrate panel assemblies that can be formed by the system 10 of FIG. 1. More particularly, FIG. 2 illustrates a panel assembly 30 that can have the panel substrate 18 injection molded with the first configuration and FIG. 3 illustrates a panel assembly 34 that can have the panel substrate 20 injection molded with the second configuration. With additional reference to FIG. 2A, a portion of the panel assembly 30 is shown including the panel substrate 18, skin 22 and a trim part 32. In the illustrated embodiment, the trim part 32 is configured as a speaker cover, though this is not required and the trim part 32 could be some other type of trim part. With additional reference to 3A, a portion of the panel assembly 34 is shown including the panel substrate 20 and skin 22. The panel assembly 34 does not include a trim part such as trim part 32 and is generally solid and/or contiguous at the location at which the trim part 32 is provided on the panel assembly 30. As will be described in more detail below, the panel assemblies 30 and 34 can be produced by the same system 10 of FIG. 1 via the injection mold 12, which is a single injection mold, together with the secondary process station 14 and the trimming station 16 for the panel assemblies 30.

Figure 4:
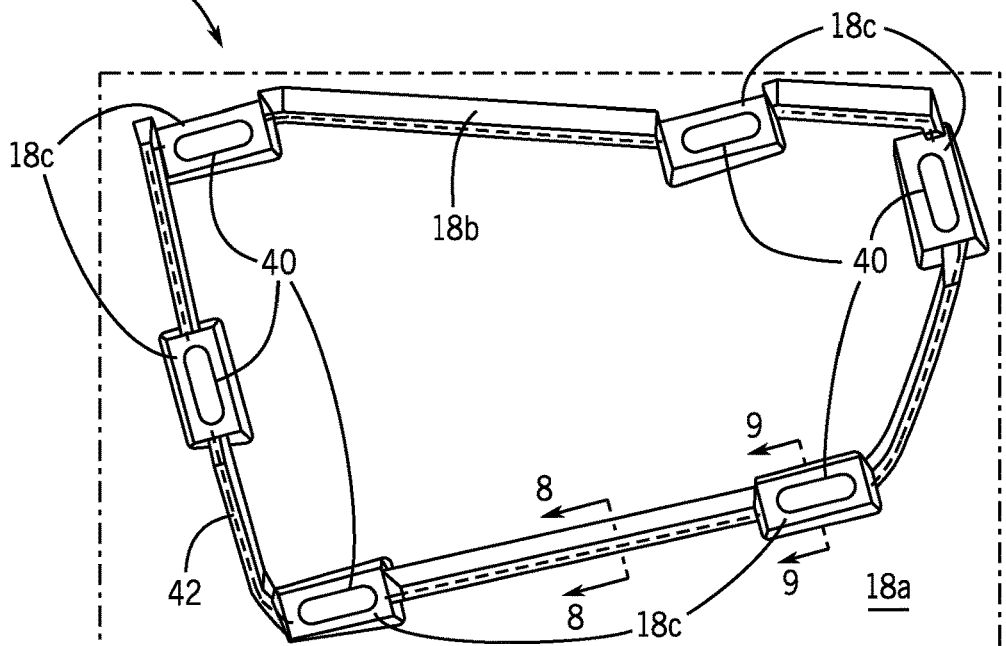
FIG. 4 is a partial underside view of the panel substrate of the panel assembly of FIGS. 2 and 2A showing spaced apart thick areas defining core pin apertures and a trim line recess interconnecting the thick areas.

FIG. 4 shows the panel substrate 18, and particularly an underside 18a thereof, corresponding generally to the portion of the panel substrate 18 shown in FIG. 2A. As described above, the panel substrate 18 is provided by the injection mold 12 as having the first configuration for a first vehicle type. As shown, the underside 18a of the panel substrate 18 includes optionally a trim line recess 18b, optionally a plurality of thick portions or areas 18c defined in spaced apart relation to one another along and interrupting the trim line recess 18b, and a plurality of core pin apertures 40. When thick areas 18c are provided, the core pin apertures 40 may be positioned in each of the plurality of thick areas 18c. When the trim line recess 18b is present, the trim line recess 18b may define or be defined at the location of a predetermined trim line 42 (shown schematically in FIG. 4 and not actually appearing in the panel substrate 18) along which the panel substrate 18 will be trimmed in the trimming station 16. Therefore, it is to be understood that the core pin apertures 40 may be applied without either the thick areas 18c or the trim line recess 18b, the core pin apertures 40 may be applied with the trim line recess 18b but without the thick areas 18c, the core pin apertures 40 may be applied with the thick areas 18c but without the trim line recess 18b, or the core pin apertures 40 may be applied with both the trim line recess 18b and the thick areas 18c.

Figure 3A:
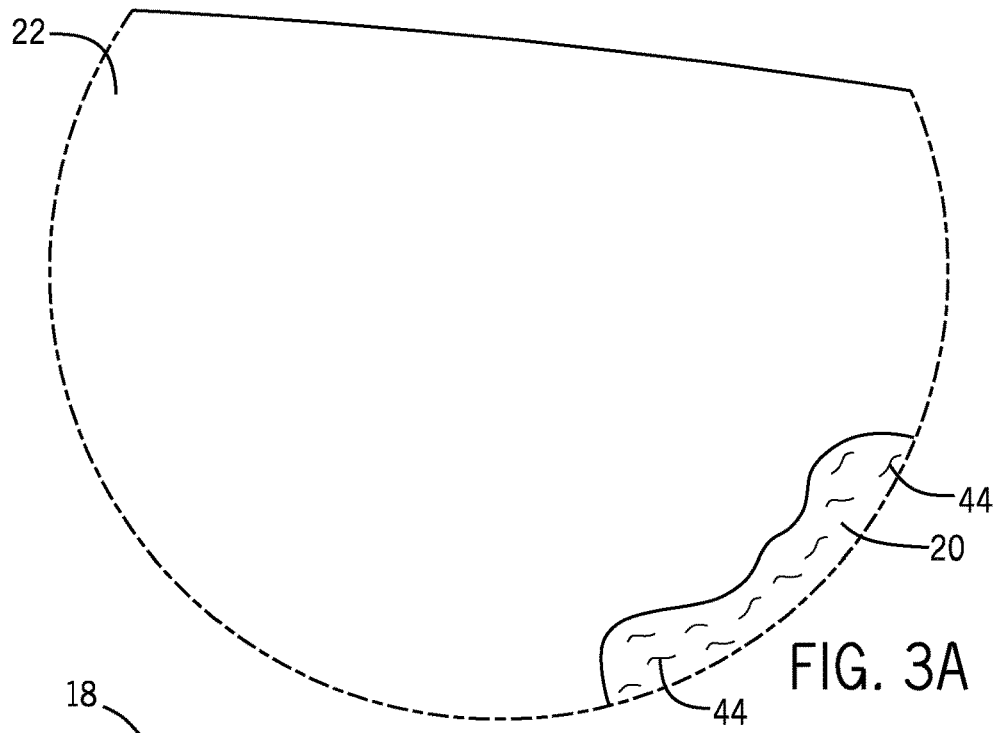
FIG. 3A is an enlarged partial perspective view of the panel assembly of FIG. 3 showing a solid area at the location where the trim part is mounted to the panel substrate of FIG. 2A.
Figure 5:
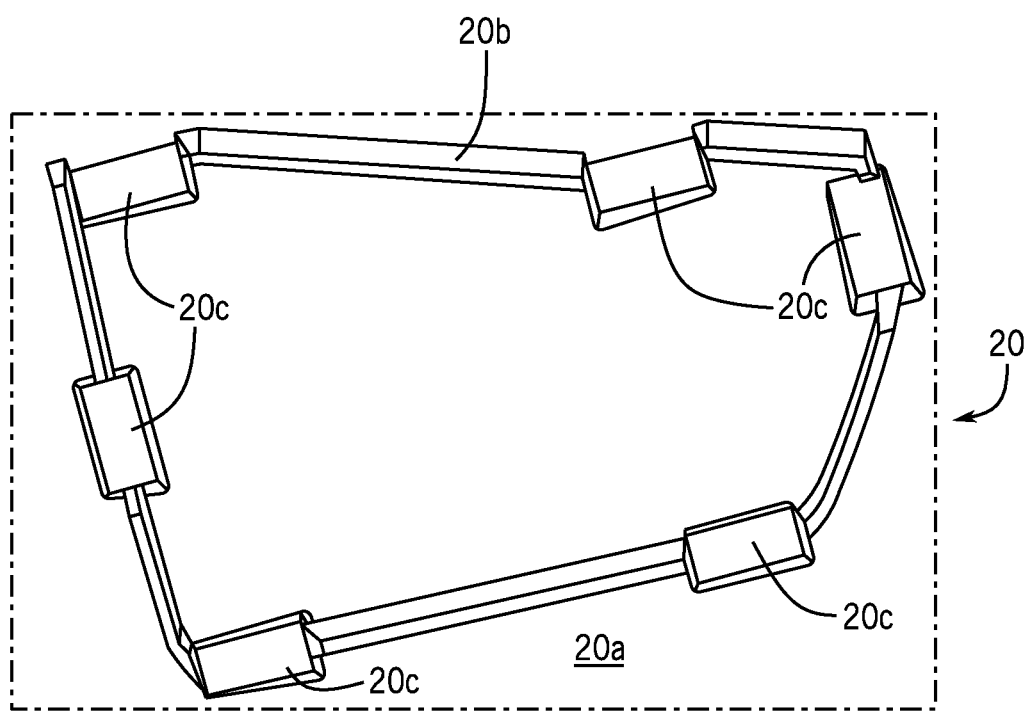
FIG. 5 is a partial underside view similar to FIG. 4 but of a panel substrate of the panel assembly of FIGS. 3 and 3A showing spaced apart thick areas (without core pin apertures) and a trim line recess interconnecting the thick areas.

FIG. 5 shows the panel substrate 20, and particularly an underside 20a thereof, corresponding generally to the portion of the panel substrate 20 shown in FIG. 3A. As described above, the panel substrate 20 is provided by the injection mold 12 as having the second configuration for a second vehicle type. Like the panel substrate 18, the underside 20a of the panel substrate 20 may include an optional trim line recess 20b and an optional plurality of the thick portions or areas 20c defined in spaced relation to one another along and interrupting the trim line recess 20b. There are no core pin apertures (e.g., core pin apertures 40 of the panel substrate 18) defined in the thick areas 20c of the panel substrate 20. In all other respects, the trim line recess 20b and the thick areas 20c can be identical to the trim line recess 18b and the thick areas 18c on the panel substrate 18.

Figure 6:
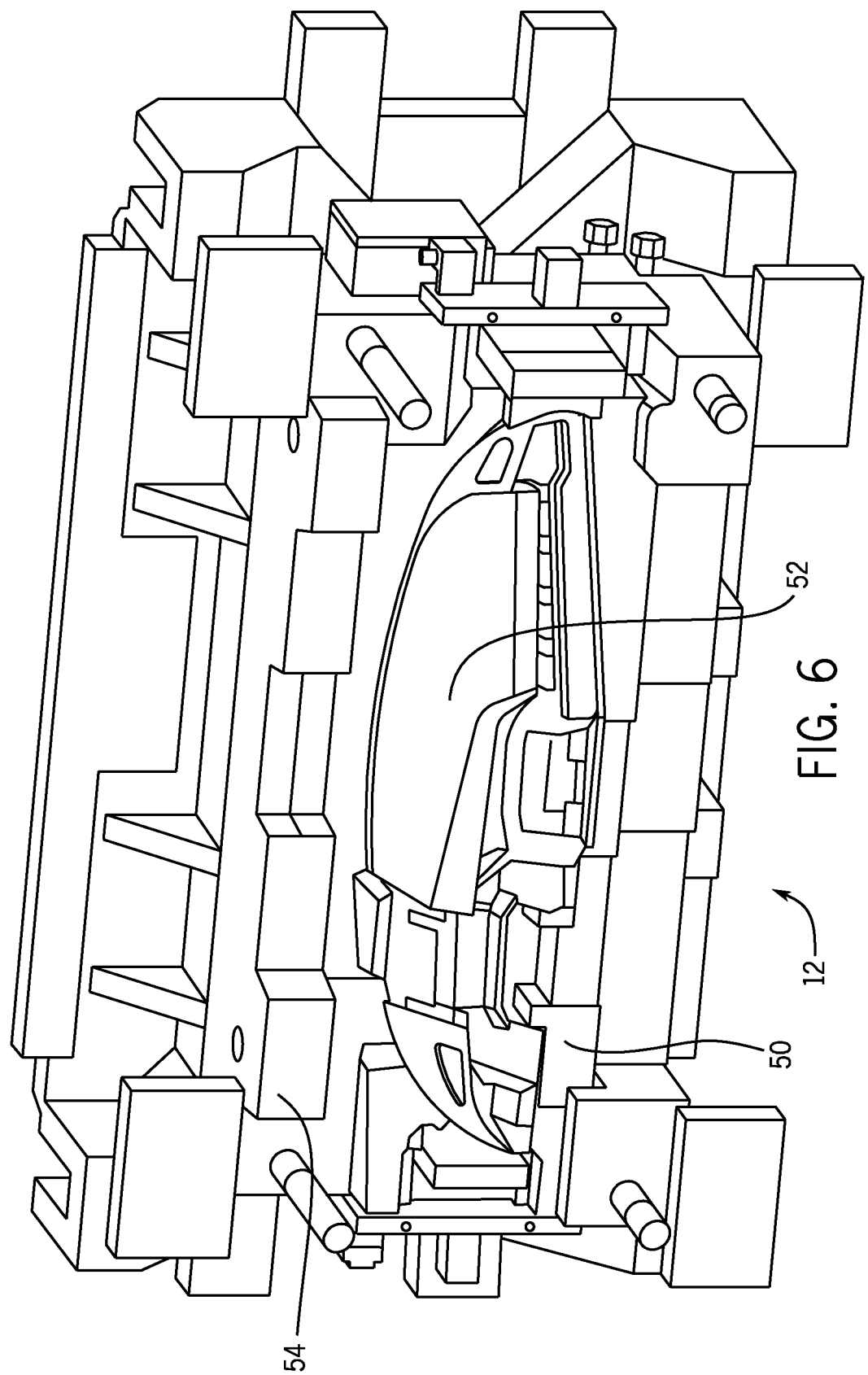
FIG. 6 is a schematic view of an injection mold according to an exemplary embodiment.

With reference now to FIG. 6, the injection mold 12 is shown in more detail but still schematically. The mold 12 includes a lower or first mold half 50 having a molding surface or lower side 52 and an upper or second mold half 54. The lower side can be curved to thereby provide a curved panel substrate 18 or 20. With additional reference to FIG. 7, which shows the upper mold half 54 removed from the mold 12, the upper mold half 54 has a molding surface or upper side 56. The lower side 52 defines a lower side of a mold cavity in the injection mold 12 and forms the underside of the injection molded panel substrate (i.e., the sides 18a and 20a of the panel substrate shown in FIGS. 4 and 5). Likewise, the upper side 56 defines an upper side of the mold cavity in the mold 12 and forms the upper side of the injection molded panel substrate (i.e., the sides revealed in FIGS. 2A and 3A). The upper side 56 can be a textured or contoured surface (not shown) that defines the upper sides 18d, 20d of the panel substrates 18, 20 as textured or contoured surfaces (see texturing 44 in FIG. 3A, for example).

Figure 6A:
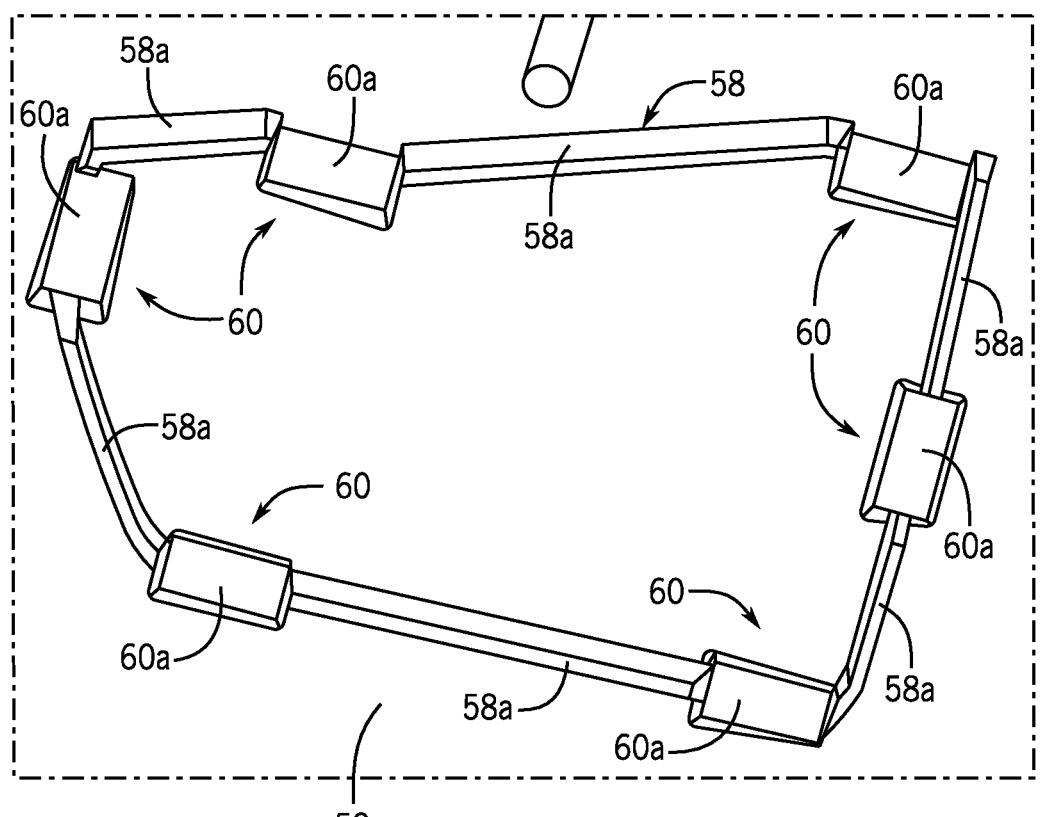
FIG. 6A is a partial enlarged view of the lower mold half of FIG. 6 showing a trim line ridge and recessed areas defined on a molding surface of the lower mold half.

With reference to FIG. 6A, which shows an enlarged portion of the lower side 52 that forms both the optional trim line recess 18b or 20b and the optional thick portions 18c and 20c when molding the substrates 18, 20, the lower side 52 can include a trim line ridge 58 protruding from the lower side 52 toward the upper side 56 and a plurality of recessed areas 60 (also referred to herein as recesses) spaced apart from one another and defined along the trim line ridge 58 so as to interrupt or form gaps in the trim line ridge 58. Each of the trim line ridge 58 and the plurality of recesses 60 define a perimeter, at least partially. As shown, the trim line ridge 58 extends between and interconnects the recessed areas 60 to define the perimeter. In the illustrated embodiment, the recessed areas 60 are generally rectangular shaped depressions have relatively flat bottoms 60a, though this configuration is not required. For sake of clarity, these mold features (i.e., the trim line ridge 58 and the recessed areas 60) are not shown in FIG. 6. The recessed areas 60 interrupt the trim line ridge 58 thereby defining the trim line ridge 58 as a plurality of spaced part trim line ridge portions 58a that define the perimeter. Accordingly, the ridge portions 58a are spaced apart from one another to define gaps therebetween along the perimeter. The recessed areas 60 are disposed respectively in these gaps defined between adjacent ones of the ridge portions 58a.

Figure 7A:
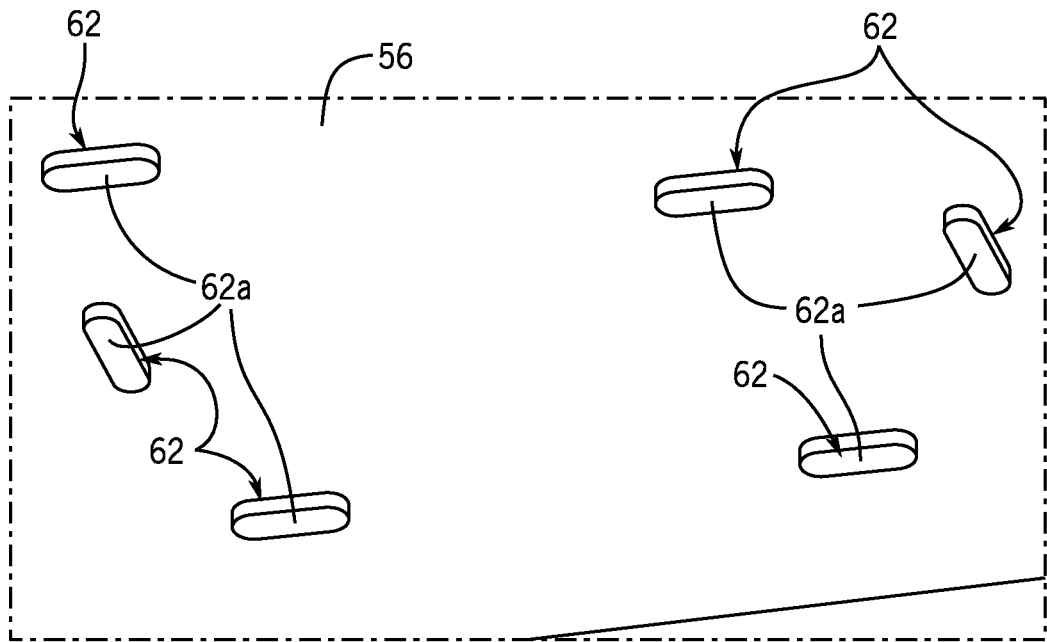
FIG. 7A is a partial enlarged view of the upper mold half of FIG. 7 showing core pins protruding from a molding surface of the upper mold half.
Figure 7B:
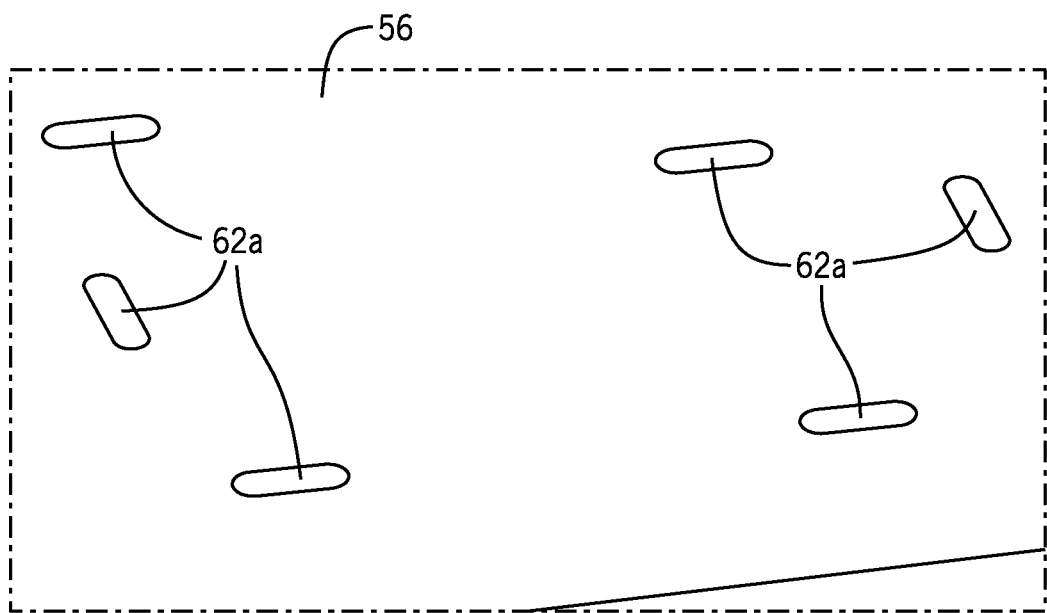
FIG. 7B is a view similar to FIG. 7A but showing core pins retracted into the molding surface of the upper mold half so as to be conformal with the molding surface.

With additional reference to FIGS. 7A and 7B, which shows an enlarged portion of the upper side 56 that is opposite the portion of the lower side 52 shown in FIG. 6A, the injection mold 12 includes a plurality of fingers or core pins 62 that are movable or extendable into the mold cavity from the upper side 56 of the upper mold half 54. More particularly, and with further reference to FIGS. 14 and 15, each of the core pins 62 is moveable between a first or retracted position (shown in FIGS. 7B and 14) wherein each core pin 62 is removed from the mold cavity of the injection mold 12 and a second or extended position (shown in FIGS. 7A and 15) wherein each core pin 62 protrudes into the mold cavity. Each of the core pins 62 is spaced apart on the upper side 56 of the upper mold half 54 and is relatively positioned in alignment with the recessed areas 60 on the lower mold half 50. The core pins 62 each have a generally flat distal or outer surface 62a that can mate in sealing engagement with the flat bottoms 60a of the recessed areas 60 on the lower side 52.

Figure 14:
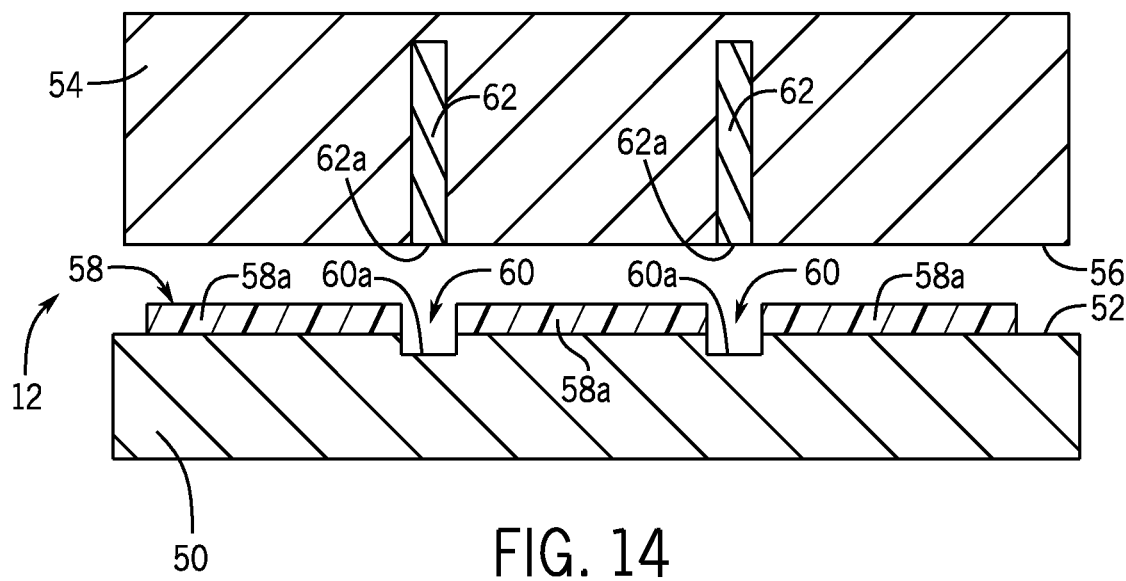
FIG. 14 is a schematic cross-section view of the injection mold of FIG. 6 showing the core pins retracted within the upper mold half.

These flat distal surfaces 62a can be conformal with the upper side 56 when the core pins 62 are retracted to define a portion of the mold cavity (as shown in FIGS. 7B and 14). That is, the distal surface 62a of each core pin 62 can be conformal with the upper side or molding surface 56 of the upper mold 54 when the core pins 62 are in the retracted position to allow the panel substrate 20 to be molded by the mold 12 and the core pins 62 can extend outward from the upper side or molding surface 56 of the upper mold 54 when the core pins 62 are in the extended position to allow the panel substrate 18 to be molded by the mold 12. Additionally, each core pin 62 can be positioned in a corresponding one of the recessed areas 60 of the lower side 52 defined along the perimeter. In particular, the core pins 62 can engage the lower side 52 of the lower mold 50, and particularly engage the flat bottoms 60a of the recesses 60, when the core pins 62 are in the extended position.

Figure 15:
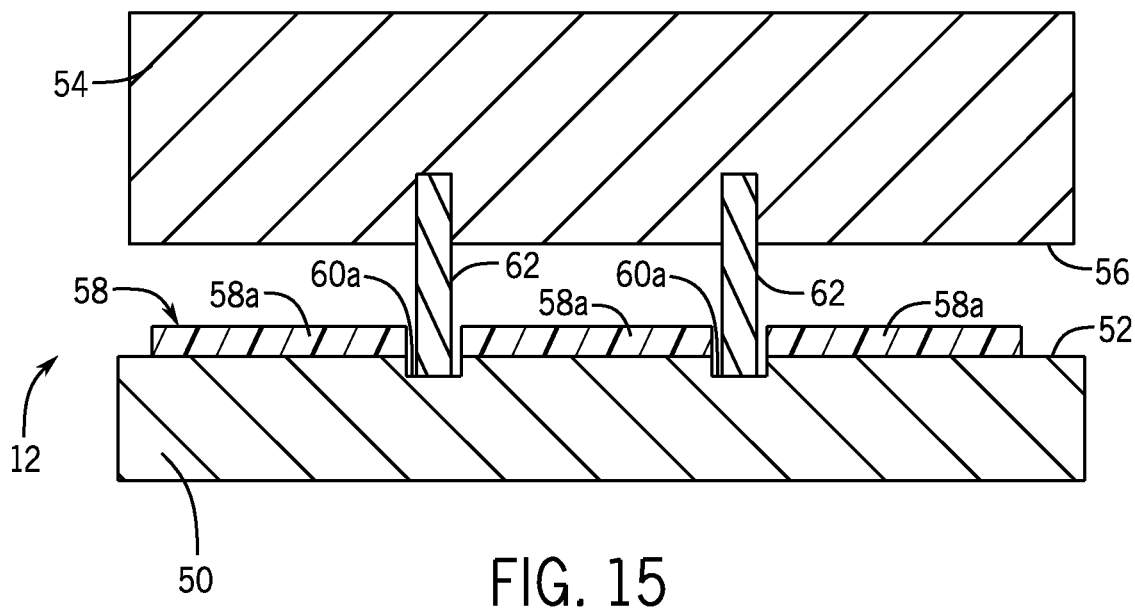
FIG. 15 is another schematic cross-section view similar of the injection mold similar to FIG. 14 but showing the core pins extended from the upper mold half and received within recesses defined in a lower mold half.

In operation, as shown in FIG. 15, the core pins 62 are each in the extended position and received in the recessed areas 60 of the lower side 52 to complete the perimeter partially formed by the trim line ridge 58 when the panel substrate is molded with the first configuration (i.e., panel substrate 18 of FIG. 4). Accordingly, the core pins 62 define the core pin apertures 40 in the panel substrate 18. As shown in FIG. 4, the core pin apertures 40 are spaced apart along the trim line recess 18b (and thus along the predetermined trim line) to, ultimately after trimming, define the part aperture 26 of FIG. 10 together with a portion of the trim line recess 20b that remains after trimming. In contrast, as shown in FIG. 14, the core pins 62 are each in the retracted position when the panel substrate is molded with the second configuration (i.e., panel substrate 20 of FIG. 5). Accordingly, no pin apertures 40 are formed when the core pins 62 are in the retracted position.

Also, because the core pins 62 can be conformal with the upper side 56 when retracted to form the panel substrate 20, the panel substrate 20 corresponds to an entirety of the mold cavity of the mold 12 and is generally molded as if the core pins 62 are not present. There can be, however, some evidence of the core pins 62 on the upper side 20d of the panel substrate (e.g., footprints or mold artifacts showing on the molded part, not shown).

The recessed areas 60 can advantageously function to allow the core pins 62 to be moved by a single actuator (e.g., one hydraulic cylinder, not shown) even when the molded parts (i.e., substrates 18 and 20) have curved configurations. More particular, the core pins 62 may all move a same distance (e.g., a stroke distance) between the retracted position and the extended position when a single actuator is used. To enable each of the core pins 62 to engage and/or mate with the lower side 52 when in the extended position, the recessed areas 60 can be provided at varying depths relative to one another. Accordingly, when a single actuator is used, each of the plurality of core pins 62 travels from the retracted position to the extended position along parallel paths and each finger travels the same distance. The recessed areas 60 function to accommodate the core pins 62 in such an arrangement. Alternatively, multiple actuators can be used so that the core pins 62 can travel along non-parallel paths and/or at different stroke lengths.

Figure 8:
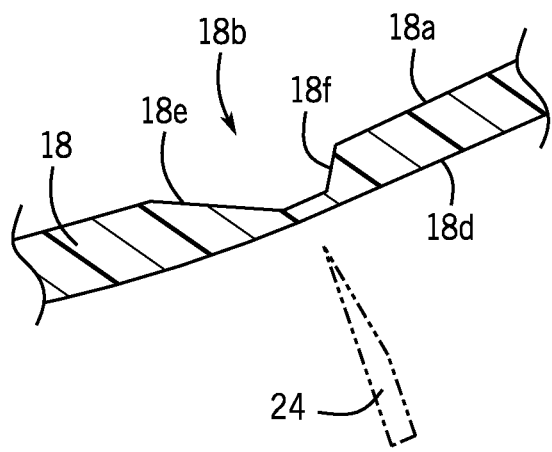
FIG. 8 is a partial cross-sectional view taken along the line 8-8 of FIG. 4.
Figure 9:
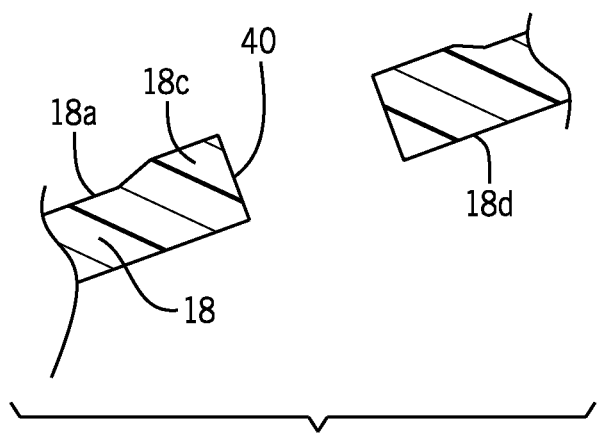
FIG. 9 is a partial cross-sectional view taken along the line 9-9 of FIG. 4.

In both panel substrates 18, 20, the trim line ridge 58 (when present) in the lower side 52 of the lower mold half 50 forms a trim line recess (trim line recess 18b in the panel substrate 18 and trim line recess 20b in the panel substrate 20). Only the trim line recess 18b is further used, as only the panel substrate 18 undergoes trimming at the trimming station 16. However, as part of being able to mold both panel substrates 18 and 20 on a single mold 12, the trim line recess 20b is formed in the panel substrate 20, though it is not further used. With additional reference to FIG. 8, a cross-section of the trim line recess 18b on the panel substrate 18 is shown. As mentioned above, the trim line recess 18b is located on the panel substrate 18 to correspond to the predetermined trim line 42 (FIG. 4). The predetermined trim line 42 represents the location on the panel substrate 18 at which the trimmer 24 (shown only schematically in FIG. 8) of the trimming station 16 will trim the panel substrate 18 and thus also defines at least a partial perimeter of the part aperture 26. As shown in FIG. 8, the trim line recess 18b is an area of reduced thickness relative to adjacent areas of the panel substrate 18, which enables easier trimming of the part aperture 26 into the panel substrate 18. In the illustrated embodiment, an inner wall 18e of the trim line recess 18b can have a more gradual taper (e.g., 1.5 degrees) relative to an outer wall 18f of the trim line recess 18b to enable easier removal of the panel substrate 18 (and likewise of the panel substrate 20) after molding, though this is not required and other specific configurations could be employed. With reference to FIG. 9, a cross-section is shown through one of the thick areas 20c and the corresponding core pin aperture 40

Figure 10:
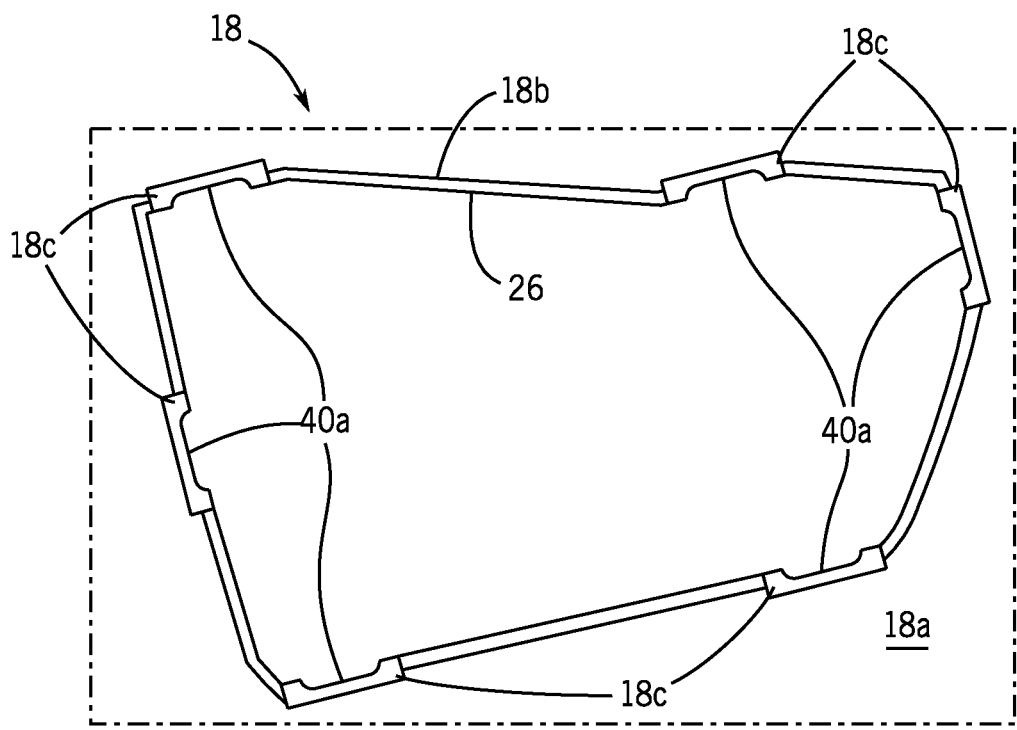
FIG. 10 is a view of the panel substrate of FIG. 4 but shown after a trimming operation trims the panel substrate to define the panel aperture therein.

FIG. 10 shows the panel substrate 18, and particularly the underside 18a thereof, after the panel substrate 18 undergoes trimming at the trimming station 16. As shown, a portion of the trim line recess 18b remains and portions of the thick areas 18c remain. In particular, those portions of the trim line recess 18b and the thick areas 18c that reside outside the predetermined trim line 42 (FIG. 4) remain after trimming at the trimming station 16. Also, portions 40a of the core pin apertures 40 residing outside the predetermined trim line 42 remain after trimming. This is achieved by the relative positioning of the core pins 62 relative to the predetermined trim line 42. That is, one or more of the core pins 62 is arranged relative to the predetermined trim line 42 so that the portions 40a remain after trimming. One or more of these remaining portions 40a of the core pin apertures 40 can serve as clip recesses for assisting in affixing or securing the trim part 32 to the panel substrate 18. For example, with additional reference to FIG. 11, clips 32a defined on an underside of the trim part 32 can be received in the remaining portions 40a of the core pin apertures 40 to clip the trim part to the panel substrate 18.

Using the system 10 described hereinabove, a panel assembly (e.g., panel assembly 30 or panel assembly 34) for a vehicle can be manufactured. The panel assembly can include a panel substrate (e.g., panel substrate 18 or panel substrate 20) formed by injection molding on the injection mold 12. The panel substrate has a first side (e.g., the upper side 18d revealed in FIG. 2A and the upper side 20d revealed in FIG. 3A) formed by the upper side 56 of the upper mold half 54 and a second, opposite side (i.e., the undersides 18a and 20a shown respectively in FIGS. 4 and 5) formed by the lower side 52 of the lower mold half 50. The panel assembly further includes one of: core pin apertures 40 defined through the panel substrate 18 along a predetermined trim line 42 or no core pin apertures 40 defined through the panel substrate 20. A trim line recess 18b or 20b can also be defined in the panel substrate 18 or 20 along the predetermined trim line 42. More particularly, when the panel substrate is the panel substrate 18 having the first configuration the panel substrate 18 can have both core pin apertures 40 and the trim line recess 18b as shown in FIG. 4. When the panel substrate is the panel substrate 20 having the second configuration, the panel substrate 20 is formed without the core pin apertures 40 but still can have the trim line recess 20b, though this will not be used as the panel substrate 20 does not get trimmed.

The panel assembly, whether panel substrate 18 or panel substrate 20, optionally includes the skin 22 attached to the first side of the panel substrate (i.e., the upper sides 18a and 20a). The skin 22 can be applied at the secondary process station 14. In one embodiment, the skin 22 is applied via a foam adhesive. When the panel assembly includes the panel substrate 18, the part aperture 26 can be trimmed into the panel substrate 18 by the trimmer 24 of the trimming station 16. As already described, trimming occurs along the predetermined trim line 42 and results in the part aperture 26 being defined through the panel substrate 18 as shown in FIG. 10. Additionally, the remaining portions 40a of the core pin apertures 40 (i.e., the portions that remain after trimming of the panel substrate 18) can function to assist in clipping the trim part 32 to the panel substrate 18.

Figure 11:
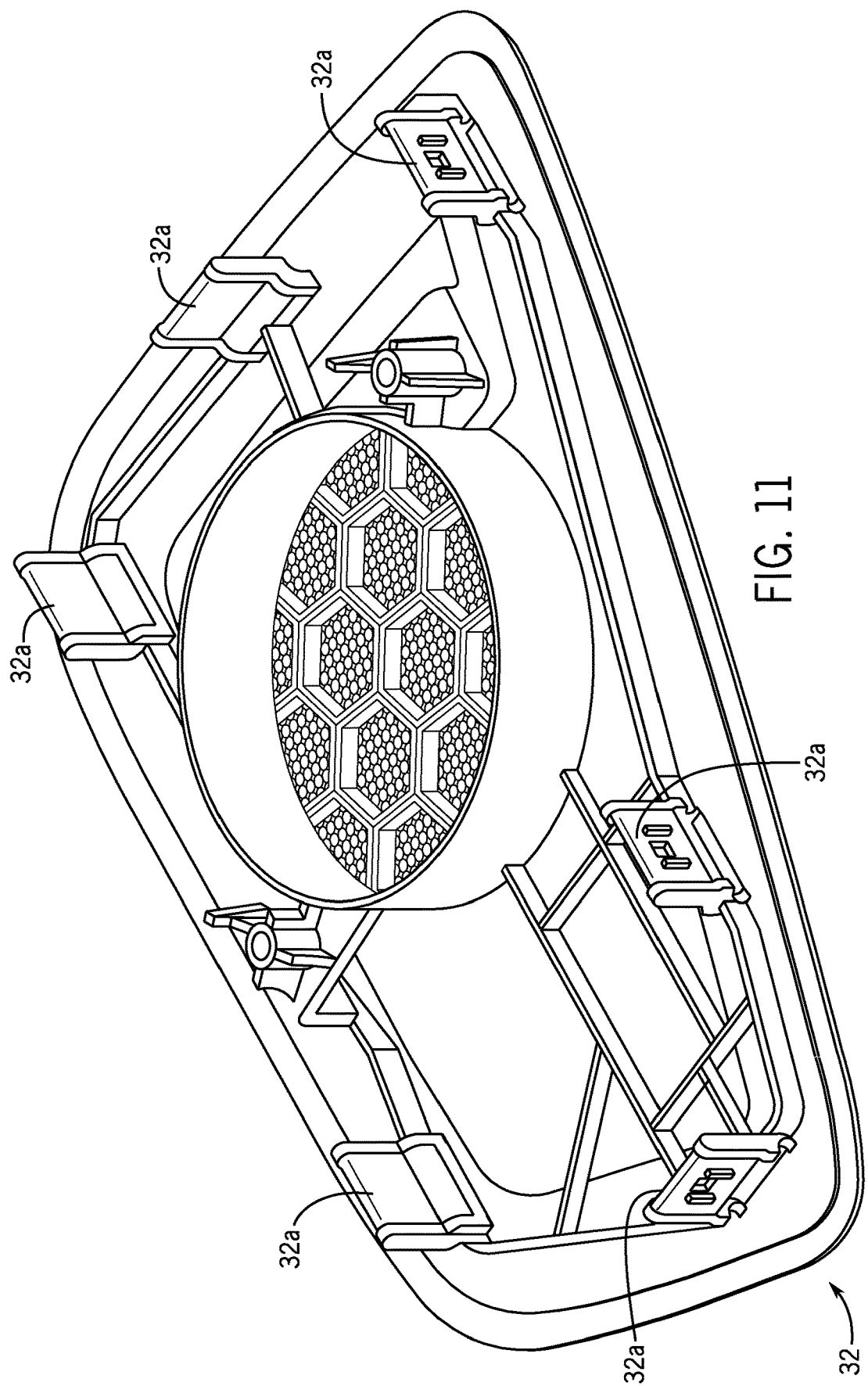
FIG. 11 is an underside perspective view of the trim part (e.g., a speaker cover) of FIG. 2A.
Figure 12:
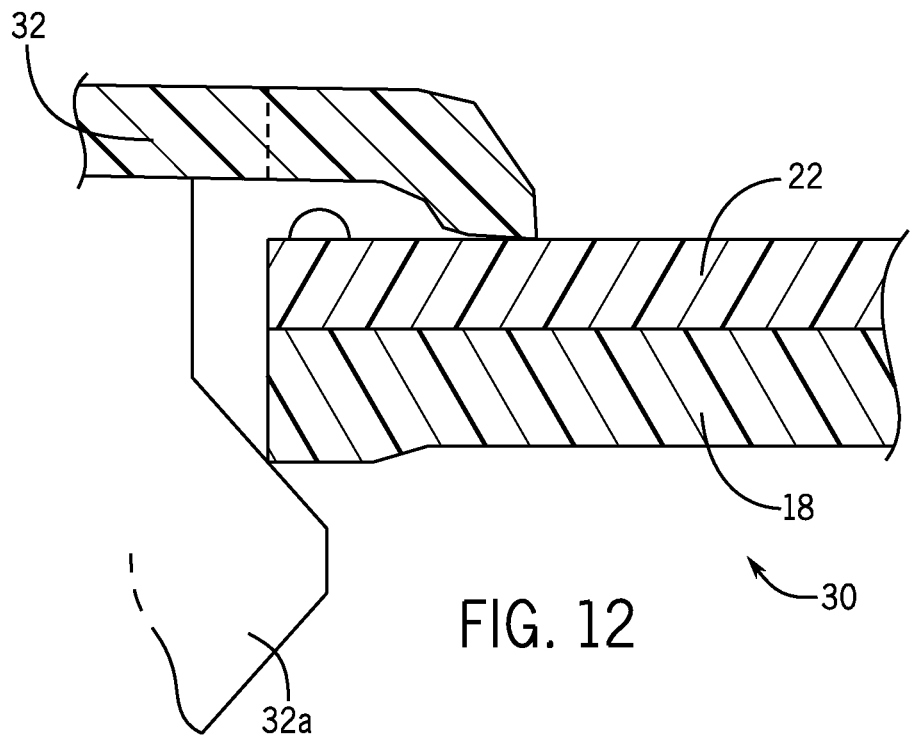
FIG. 12 is a partial cross-sectional view of the panel assembly of FIGS. 2 and 2A taken at the location of one of the core pin apertures.

When the panel assembly includes the panel substrate 18, the panel assembly additionally may include the trim part 32, which can be in the form of a speaker cover as shown in the illustrated embodiment in FIGS. 2 and 2A, though this is not required. With reference to FIGS. 11 and 12, the trim part 32 may have integrally molded clips 32a received into the remaining portions 40a of the core pin aperture of the panel substrate 18.

Figure 13:
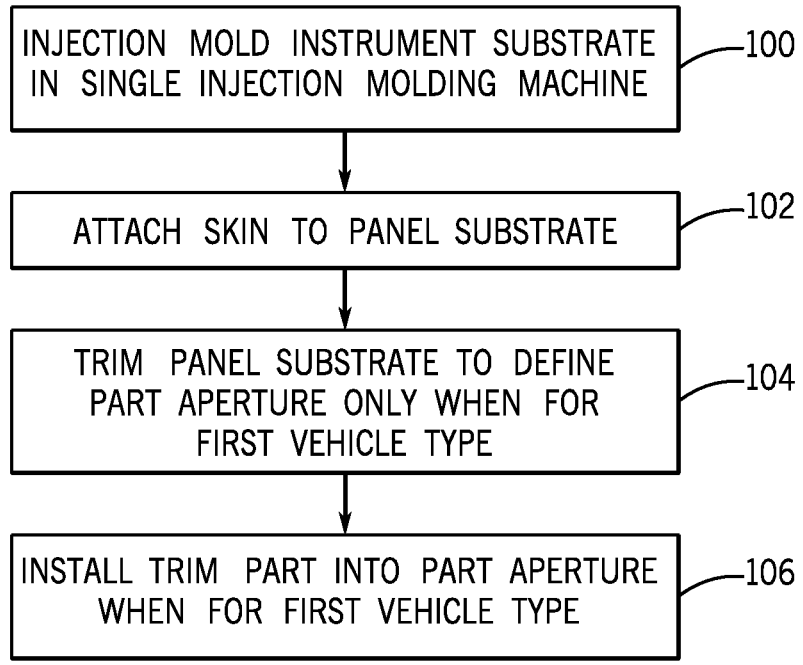
FIG. 13 is a process flow diagram depicting a method for manufacturing a panel assembly for a vehicle according to an exemplary embodiment.

With reference now to FIG. 13, a method for manufacturing a panel assembly for a vehicle will now be described. In particular, the method will be described in association with the mold 12 and optionally the rest of the system 10 described hereinabove, though it is to be appreciated by those skilled in the art that the method could be used with other systems and/or the system 10 configured alternately. As shown in FIG. 13, the method includes, at 100, injection molding a panel substrate in a single injection mold. That is, the single injection mold 12 can selectively injection mold the panel substrate 18 having a first configuration when the panel substrate 18 is for a first vehicle type or the panel substrate 20 when the panel substrate 20 has a second, different configuration when the panel substrate 20 is for a second vehicle type.

Injection molding of the panel substrate 18 includes molding the panel substrate 18 with the first configuration with the plurality of core pins 62 each in the extended positions (the positions shown in FIG. 7A), while molding the panel substrate 20 with the second configuration occurs with the plurality of core pins 62 each in the retracted position (as shown in FIG. 7B). As already described herein, injection molding the panel substrate 18 with the first configuration with the plurality of core pins 62 in the extended position defines the core pin apertures 40 in the panel substrate 18. The core pin apertures 40 are spaced apart along the predetermined trim line 42 which can be at least partially defined by the trim line ridge 58 extending from the lower side 52 of the lower mold half 50. As also already described, each of the plurality of core pins 62 corresponds to one of the pin apertures 40 defined in the panel substrate 18.

Thus, when the panel substrate 18 is injection molded, the core pins 62 can function to define the pin apertures 40 through the panel substrate 18. In contrast, when the panel substrate 20 is injection molded with the core pins 62 in the retracted position, no pin apertures 40 are defined on the panel substrate 20. A trim line recess 18b or 20b can be defined in both of the panel substrates 18 and 20, though it is only used for trimming on the panel substrate 18. The injection molding of the panel substrate in 100 can optionally include molding a textured or contoured surface on the first side of the panel substrate. This is accomplished by providing a textured or contoured upper side 56 of the upper mold half 54 of the injection mold 12. By dispersing the core pins 62 and using a plurality of core pins, any un-textured portion of the panel substrate 20 formed by the flat distal surfaces 62a of the core pins 62 comprises a relatively small portion of the panel substrate 20 and are not concentrated in a single area of the panel substrate 20.

Next, as shown at 102, the skin 22 can be attached to the panel substrate 18 or 20 on a first side of the panel substrate (upper side 18d or upper side 20d). The skin 22 generally can adhere or attach best to the panel substrate 18 or 20 when the surface to which the skin 22 is directly attached is textured or contoured. Accordingly, it is advantageous to have the largest possible area of the upper sides 18a or 20a of the substrates 18 or 20 textured or contoured. When the panel substrate 18 is injection molded, substantially an entirety of the upper side of the panel substrate 18 can be contoured or textured so good adherence of the skin 22 can occur. In a non-limiting example, when the panel substrate 20 is injection molded, all but the portion of the panel substrate 20 formed on the flat distal surfaces 62a of the core pins 62 are contoured or textured. Since the core pins 62 are distributed (i.e., not concentrated) and form a relatively small portion of the upper side of the panel substrate 20, good adherence of the skin 22 can also occur on the panel substrate 20. Such good adherence might not occur in instances where a larger portion and/or more concentrated portions of non-textured or flat areas results (e.g., if a single large core pin or slide were used to injection mold the part aperture 26).

Next, at 104, the panel substrate can be trimmed when the panel substrate has the first configuration (i.e., when the panel substrate 18 is injection molded at 100) to define the part aperture 26 in the panel substrate 18. In contrast, when the panel substrate 20 is injection molded at 100, no trimming of the panel substrate 20 is necessary. The molding of the trim line recess 18b into the underside of the panel substrate 18 can aid in trimming of the part aperture 26 as reduced force is needed to trim the trim line recess 18b due to it being formed as a thinned section of the panel substrate 18. The trim line recess 20b is also present in the panel substrate 20 but is not used for trimming and is on the underside of the panel substrate 20 thereby not presenting aesthetic or other issues. Trimming at 104 includes trimming via the trimmer 24 at the predetermined trim line 42. By the arrangement of the core pins 62 on the upper side 56 relative to the trim line ridge 58 on the lower side 52, each pin aperture 40 can be formed so that the remaining portions 40a after trimming define one or more clip recesses.

When the panel substrate 18 is molded at 100 and the part aperture 26 is trimmed into the panel substrate 18 at 102, a trim part 32, which in the illustrated embodiment is a speaker cover, can next be installed into the part aperture 26. The clips 32a of the trim part 32 can be accommodated in the portions 40a defined in the panel substrate 18.

Advantages of the above described system 10 and corresponding method include the provision of a system and method that produces a panel assembly adapted for use on varying vehicle types. The use of the plurality of spaced apart core pins 48 along the trim line minimizes the non-textured surface area on the molded substrate which improves adherence of the skin 22 to the panel substrate. A further advantage is the trim line provided on the underside of the panel substrate to enable trimming of the panel substrate when the panel substrate is to be configured as panel substrate 18 for a first vehicle type. Additionally, the plurality of core pins 48 mold the pin apertures 40 in recessed relation relative to the part aperture 26 so as to enable clip recesses to be formed to enable the trim part 32 to more easily clip to the substrate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for manufacturing a panel assembly for a vehicle, comprising:
  injection molding a panel substrate in a single injection mold, and injection molding the panel substrate includes:
    molding a trim line recess on an underside of the panel substrate with a reduced thickness relative to adjacent areas of the panel substrate,
    molding a plurality of thick portions defined in spaced apart relation to one another along and interrupting of the trim line recess, each thick portion being an area of increased thickness relative to adjacent areas of the panel substrate; and
  trimming the panel substrate at a predetermined trim line defined by the trim line recess to define a part aperture in the panel substrate;
  wherein the single injection mold includes a plurality of core pins, each of the plurality of core pins is movable between a retracted position wherein each of the plurality of core pins is removed from a mold cavity of the single injection mold in which the panel substrate is formed and an extended position wherein each of the plurality of the core pins extends into the mold cavity in which the panel substrate is formed, and further wherein injection molding the panel substrate includes molding the panel substrate with the plurality of core pins each in the extended position,
  wherein injection molding the panel substrate with the plurality of core pins in the extended position defines core pin apertures in the thick portions of the panel substrate that are spaced apart along the predetermined trim line, the core pin apertures intersected by the predetermined trim line such that first portions of the core pin apertures reside outside of the predetermined trim line and second portions of the core pin apertures reside inside of the predetermined trim line, wherein the first portions of the core pin apertures remain in the panel substrate after trimming and at least partially define the part aperture in the panel substrate.

2. The method of claim 1 wherein the panel substrate includes a first side and a second, opposite side, and further wherein injection molding the panel substrate includes molding a textured surface on the first side, the method further including:

attaching a skin to the panel substrate on the first side of the panel substrate.

3. The method of claim 1 wherein trimming the panel includes trimming at the predetermined trim line with a trim die cutting edge.

4. The method of claim 3 wherein injection molding the panel substrate includes molding the trim line recess along the predetermined trim line with a reduced thickness relative to adjacent areas of the panel substrate.

5. The method of claim 1 wherein the panel substrate includes a first side and a second, opposite side, wherein injection molding the panel substrate includes molding a textured surface on substantially an entirety of the first side.

6. The method of claim 1 further including: installing a trim part into the part aperture in the panel substrate.

7. The method of claim 1, wherein each of the plurality of core pins corresponds to one of the plurality of core pin apertures defined in the panel substrate.

\* \* \* \* \*